March 27, 1934.   L. A. PARADISE   1,952,331
COMBINE
Filed Jan. 13, 1932

WITNESS
Walter Ackerman

INVENTOR
Louis A. Paradise
BY Brown, Jackson,
Boettcher & Dienner
ATTORNEYS.

Patented Mar. 27, 1934

1,952,331

UNITED STATES PATENT OFFICE 1,952,331

COMBINE

Louis A. Paradise, Moline, Ill., assignor to Deere & Company, Moline, Ill., a corporation of Illinois Application January 13, 1932, Serial No. 586,281

5 Claims. (Cl. 56—122)

The present invention relates to combines and has more particularly to do with an improved construction of beater which is employed in the grain receiving compartment or feeder house of the thresher unit of the combined.

As is well understood by those skilled in the art, in the operation of a combine the grain cut by the harvester unit is conveyed therefrom by a transversely extending upwardly inclined platform conveyor and delivered to a fore and aft extending conveyor in the feeder house of the thresher unit, and the latter conveyor carries the grain to the cylinder of the thresher unit. In such a combine the bulk of the cut grain is delivered to the fore and aft extending conveyor in the feeder house on the far side thereof, and a rotating beater is provided in the feeder house positioned just in front of the cylinder and adjacent to and above the far side of the fore and aft extending conveyor. Such a beater usually comprises a pair of oppositely extending paddles of a length about half the width of the grain receiving compartment or feeder house, and the function of the beater is to press down the loose grain as it is fed into the receiving compartment onto the fore and aft conveyor from the transverse conveyor so that it will be properly fed into the cylinder. It has been found, however, that such beaters are objectionable as the grain is delivered to the cylinder just as it is delivered by the transverse conveyor onto the fore and aft conveyor, i. e., the greater portion of the grain is delivered to the outer end or far side of the cylinder adjacent the far side of the fore and aft conveyor, and is not equally distributed along the length of the cylinder as it is fed thereto. It has also been found that in the use of a beater as above described, particularly when the combine is operating under certain unfavorable conditions which sometimes occur, the grain stalks tend to wind upon the beater, in some instances to such an extent as to make it necessary to stop the machine to clean the beater.

With the above noted objections in view, it is one of the objects of the present invention to provide a beater that will not only function to press down the grain onto the fore and aft conveyor but which will also act to distribute the grain more evenly on the fore and aft conveyor so that such grain will be more evenly delivered from such conveyor into the cylinder along the entire length thereof, instead of the greater portion of the grain being delivered to the far end of the cylinder as it is with the use of the old type of paddles or beaters.

Another object of the invention is to provide a self cleaning beater from which any stalks which wind thereupon will automatically remove themselves upon continued rotation of the beater in the normal operation of the machine, and in which there is no tendency for the stalks to wind thereon to such an extent that it is necessary to stop the machine to clean the beater.

Other objects and advantageous features will be apparent from the following description of the preferred embodiment of my invention taken in connection with the accompanying drawing, in which.

Figure 1:
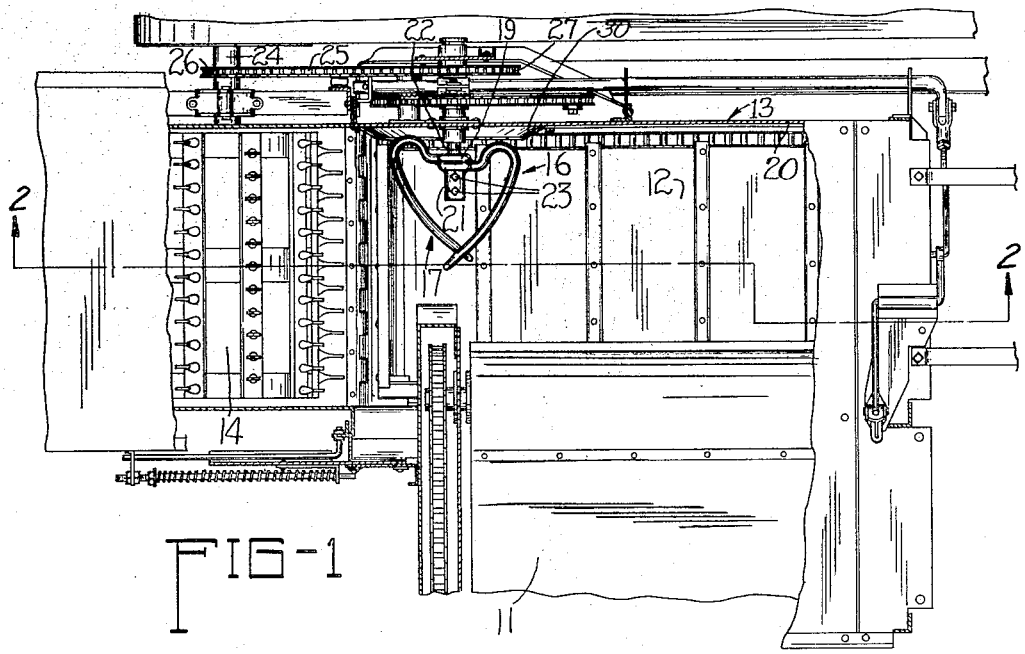
Figure 1 is a fragmentary plan view of a portion of a combine partly broken away to illustrate my improved beater in operating position and its relation to other parts of the implement with which it is operatively associated.
Figure 2:
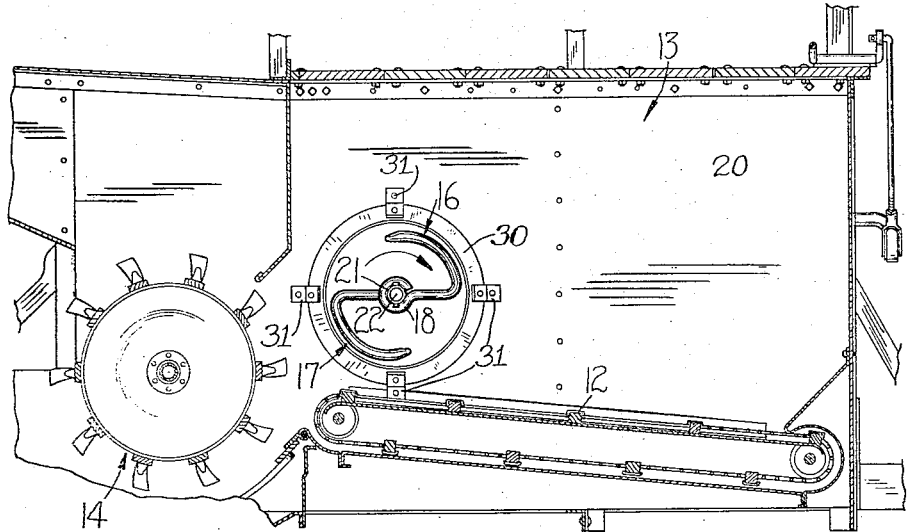
Figure 2 is a vertical cross sectional view taken on the line 2—2 of Figure 1 and illustrating the improved beater in end elevation.

In the drawing only such parts of a combine have been illustrated as are necessary to an understanding of the present invention. As therein shown, the transversely extending inclined platform conveyor which carries the cut grain from the harvester unit to the threshing unit is indicated by the numeral 11. The conveyor 11 delivers the grain onto a fore and aft extending conveyor 12 which is suitably supported by any appropriate means in or adjacent the bottom of the grain receiving compartment or feeder house 13 of the threshing unit and driven in the usual manner. The cylinder of the threshing unit to which the grain is delivered by the fore and aft extending conveyor 12 is indicated by the numeral 14.

The improved beater with which the present invention is principally concerned comprises two arms respectively indicated by the numerals 16 and 17, which arms are formed of metal rods. The inner end or base portions of said arms are bent to provide eye portions, indicated respectively by the numerals 18 and 19, and such eye portions are mounted in juxtaposition on a sleeve 21 so that the arms extend outwardly from said sleeve in diametrically opposite directions. The eye portions 18 and 19 are suitably secured to the sleeve by welding or in any other appropriate manner as desired. The sleeve 21 embraces the inner end of a shaft 22 suitably supported in and extending outwardly from the side wall 20 of the feeder house 13 opposite the discharge end of the conveyor 12. The sleeve 21 is suitably secured to the shaft to rotate therewith by means of bolts 23 or in any other suitable manner. The shaft 22 is driven from the drive shaft 24 of the cylinder 14 by means of a chain 25 trained around a sprocket 26 secured to said shaft 24 and around a second sprocket 27 suitably secured to the outer end of the beater shaft 22.

A conical shield 30 is secured, as by clips 31 or the like, to the side wall 20 and surrounds the shaft 22. The shield 30 is cone-shaped, as will be apparent from Figure 1, and is arranged so as to surround the base of the beater to guide the grain to the outer portions of the arms 16 and 17 and to prevent the grain from getting into the space between the base or inner portions of the arms 16 and 17 and the inside face of the wall 20. To this end the curvature of the base portions of the arms is such that portions thereof are disposed substantially inside the shield 30, as shown in Figure 1.

Figure 3:
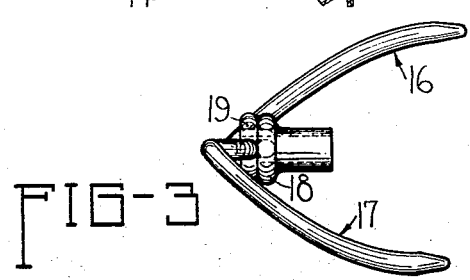
Figure 3 is an enlarged detailed side elevational view of the beater.

The arms 16 and 17 extend diametrically outwardly from the sleeve 21 in opposite directions and the outer portions of said arms are given a spiral curve formation as best shown in Figures 1 and 3. Generally speaking, the arms 16 and 17 include inner or base portions which extend radially outwardly to oppositely disposed points equidistant from the center of the sleeve 21, such points lying in the surface of an elongated cone having an axis coinciding with the axis of the shaft 22, and then both arms are given a right angle bend and extended in the same general direction, the outer portions of the arms being disposed to lie in the surface of the elongated cone. This may be better illustrated by stating that the outer portions of the arms are spirally curved in converging relation toward their free ends whereby diametrically opposite points thereof lie in the circumferences of circles of relatively slightly decreasing diameter as the free ends of the arms are approached. In addition, the arms are curved along said elongated conical surface to define a spiral or screw formation, corresponding portions of the arms, however, always lying diametrically opposite one another with respect to the axis of the beater.

By thus providing a beater the grain contacting arms 16 and 17 of which lie in the surface of a cone, a self-cleaning beater in which any straw which tends to wind on the arms will release itself, is provided, for the reason that as the beater rotates in the normal operation of the machine any stalks that may tend to wind up on the beater arms 16 and 17 will automatically move along said arms from the base of the conical surface defined by the arms at the right angle bends thereof toward the smaller portion of the conical surface defined by the tips thereof, as will be readily understood. If desired the arms may be so formed as to lie in a true cylindrical surface, that is, one in which the diameters are exactly equal, but preferably, as stated above, the curved arms gradually approach each other, that is to say, the two curved arms lie substantially in the surface of a long cone having its base at the inner or fixed end of said arms and its apex beyond the outer ends of the arms.

By making the arms 16 and 17 of the beater of spiral or screw formation the beater will not only function to press down the grain onto the fore and aft conveyor, but it will also act to distribute the grain more evenly on said conveyor, whereby the grain will be more evenly delivered into the cylinder along the entire length thereof, as will be readily understood. Also, by providing the arms of screw formation, the movement of the stalks toward the free ends thereof is materially facilitated, thus not only aiding the distribution of the stalks but also aiding in freeing the arms from any stalks that may tend to become wound thereon.

It is to be understood that the present invention also contemplates forming the arms 16 and 17 without any great pronounced spiral or screw curvature in cases where it is not so important to spread the stalks across the fore and aft moving conveyor.

While I have shown and described the preferred structural embodiment it is to be understood that widely different means may be employed in the practice of the broader aspects of my invention, as defined in the appended claims.

What I claim, therefore, and desire to secure by Letters Patent is:

1. The combination with a combine comprising a transverse conveyor, a feeder house for receiving the grain therefrom, a fore and aft conveyor in said feeder house and a cylinder adjacent the delivery end of the latter conveyor, of a beater having spiral arms rotatably mounted in the feeder house for pressing the grain down on said fore and after conveyor and distributing the grain laterally over the width of the latter conveyor, means for supporting said arms at their inner ends only, their outer ends converging laterally so that the lateral distribution of grain by the beater tends to free the arms of grain stalks and the like wound thereon, and means for rotating said beater.

2. The combination with a combine comprising a transverse conveyor, a feeder house for receiving the grain from said conveyor, a fore and aft conveyor in said feeder house, of a beater rotatably mounted in the feeder house for pressing the grain down on said fore and aft conveyor comprising a pair of arms connected together at one end and extending radially outward in opposite directions from their point of connection, said arms being bent intermediate their ends with the outer portions thereof extending at an angle from the inner portions and having a spiral curvature formation and converging at their outer ends toward the axis of the beater whereby grain stalks will be distributed laterally across said fore and aft conveyor and the beater will automatically free itself of wound stalks thereon by virtue of said converging formation, and means for rotating said beater.

3. The combination with a combine comprising a feeder house, a fore and aft conveyor in said feeder house, and a transverse conveyor for delivering grain to one point on said fore and aft conveyor, of a beater rotatably mounted in the feeder house for pressing the grain down on the latter conveyor comprising a pair of arms connected together at one end and extending radially outward in opposite directions from their point of connection, said arms being bent intermediate their ends with the outer portions thereof extending at an angle from the inner portions and converging toward each other at their free ends whereby grain stalks winding on said beater will automatically move toward the outer ends of said arms and off of said beater upon continued rotation of the same, and means for rotating said beater.

4. The combination with a combine comprising a transverse conveyor, a feeder house for receiving the grain therefrom and having a side wall, a fore and aft conveyor in said feeder house and a cylinder adjacent the delivery end of the latter conveyor, of a beater having spiral arms rotatably mounted in said side wall of the feeder house for pressing the grain down on said fore and aft conveyor and distributing the grain laterally over the width of the latter conveyor, a shield secured to said side wall including portions extending adjacent said beater to direct grain thereto, and means for rotating said beater.

5. The combination with a combine comprising a transverse conveyor, a feeder house for receiving the grain therefrom and having a side wall, a fore and aft conveyor in said feeder house and a cylinder adjacent the delivery end of the latter conveyor, of a beater having spiral arms rotatably mounted in the feeder house and including a beater shaft journaled in said side wall and means securing one end of each of said arms to the shaft adjacent said side walls, said beater arms converging outwardly from said side wall toward the axis of said shaft, and a conical shield embracing said shaft and secured to said side wall, said shield converging toward said arms to direct grain thereto and to prevent stalks from entering the space between the arms and the side wall.

LOUIS A. PARADISE.